United States Patent
Ashton et al.

[11] Patent Number: 6,136,745
[45] Date of Patent: Oct. 24, 2000

[54] HIGH ACTIVITY POLYETHYLENE CATALYSTS

[75] Inventors: David John Ashton, Carry-le-Rouet, France; Yury Viktor Kissin, East Brunswick; Robert Ivan Mink, Warren, both of N.J.

[73] Assignee: BP Chemicals Limited, London, United Kingdom

[21] Appl. No.: 09/120,113

[22] Filed: Jul. 22, 1998

[30] Foreign Application Priority Data

Jul. 25, 1997 [EP] European Pat. Off. ............. 97430020

[51] Int. Cl.[7] .............................. B01J 31/00; B01J 37/00; C08F 4/60; C08F 4/02
[52] U.S. Cl. ...................... 502/132; 502/119; 502/125; 502/128; 502/133
[58] Field of Search ................................ 502/119, 125, 502/128, 132, 133

[56] References Cited

U.S. PATENT DOCUMENTS

| | | | |
|---|---|---|---|
| 5,470,812 | 11/1995 | Mink et al. | 502/125 |
| 5,514,634 | 5/1996 | Hagerty et al. | 502/125 |
| 5,994,256 | 11/1999 | Lottes et al. | 502/125 |

FOREIGN PATENT DOCUMENTS

| | | |
|---|---|---|
| 0 193 281 A2 | 9/1986 | European Pat. Off. . |
| 0 451 901 A2 | 10/1991 | European Pat. Off. . |
| 0 533 221 A1 | 3/1993 | European Pat. Off. . |
| WO 94/20546 | 9/1994 | WIPO . |
| WO 95/13873 | 5/1995 | WIPO . |

*Primary Examiner*—Mark L. Bell
*Assistant Examiner*—J. Pasterczyk
*Attorney, Agent, or Firm*—Finnegan, Henderson, Farabow, Garrett & Dunner, L.L.P.

[57] ABSTRACT

The present invention relates to a high activity catalyst composition for the (co-)polymerisation of ethylene, optionally with an alpha olefin of 3 to 10 carbon atoms, comprising a catalyst precursor and an organoaluminium cocatalyst, wherein the catalyst precursor consists of:

(i) a silica carrier material, having from 0.3 to 1.2 mmoles of OH groups per gram of silica, (ii) a dialkylmagnesium compound of the formula $RMgR^1$, where R and $R^1$ are the same or different $C_2$–$C_{12}$ alkyl groups, in an amount comprised between 0.5 to 1.5 mmoles of dialkylmagnesium per gram of silica, (iii) a tetraalkyl orthosilicate, in which the alkyl groups contain from 2 to 6 carbon atoms, in an amount comprised between 0.2 to 0.8 mmoles per gram of silica, (iv) a chlorinated compound (X) having the formula $R_nSiCl_{4-n}$, wherein each R is the same or different and is hydrogen or an alkyl group and n is an integer from 0 to 3, in an amount comprised between 0.2 to 4 mmoles of X per gram of silica, and (v) a titanium compound in an amount comprised between 0.3 to 1.5 mmoles per gram of silica.

15 Claims, 4 Drawing Sheets

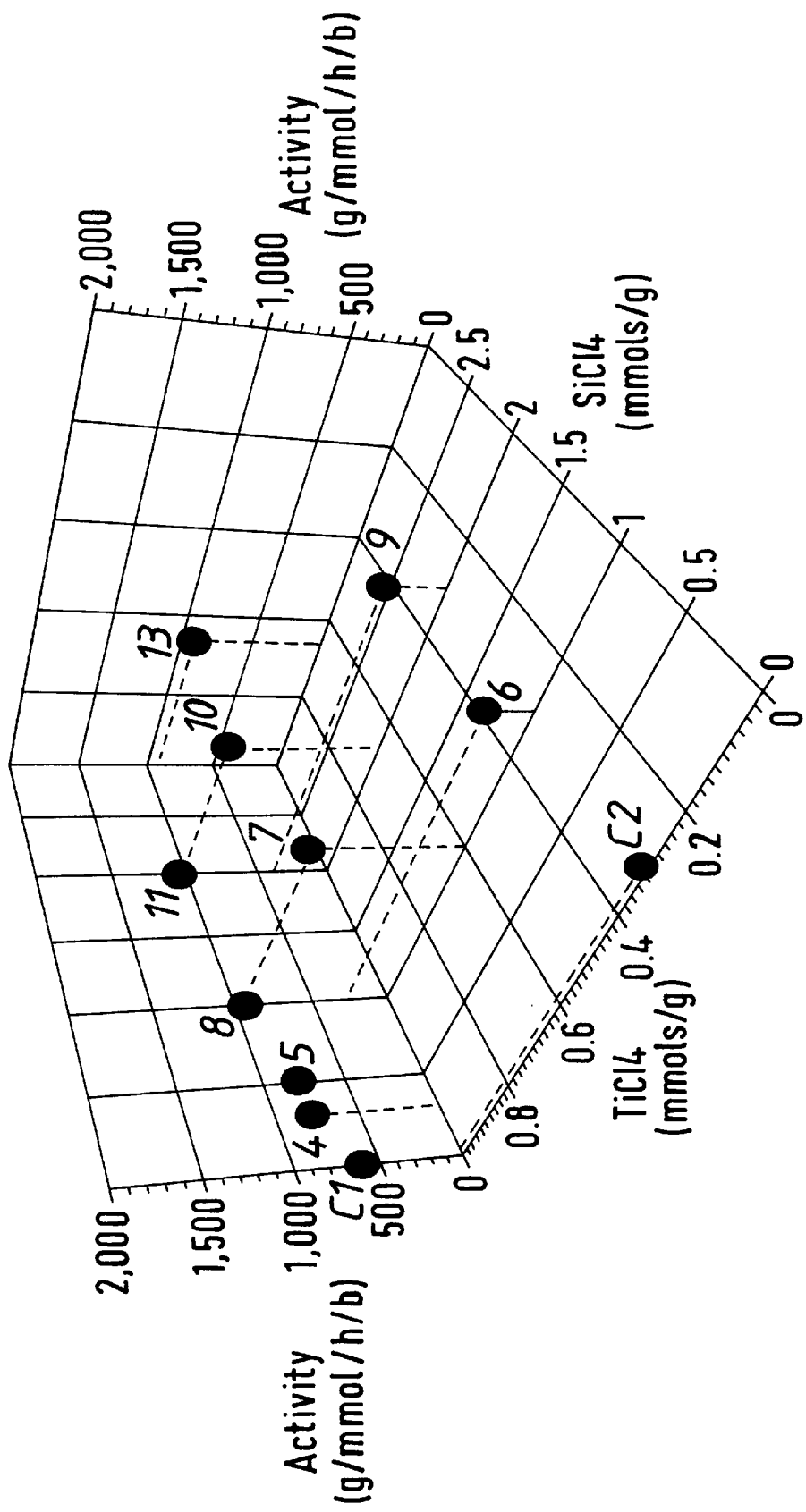
FIG. 1 TEOS=0.44 mmol/g

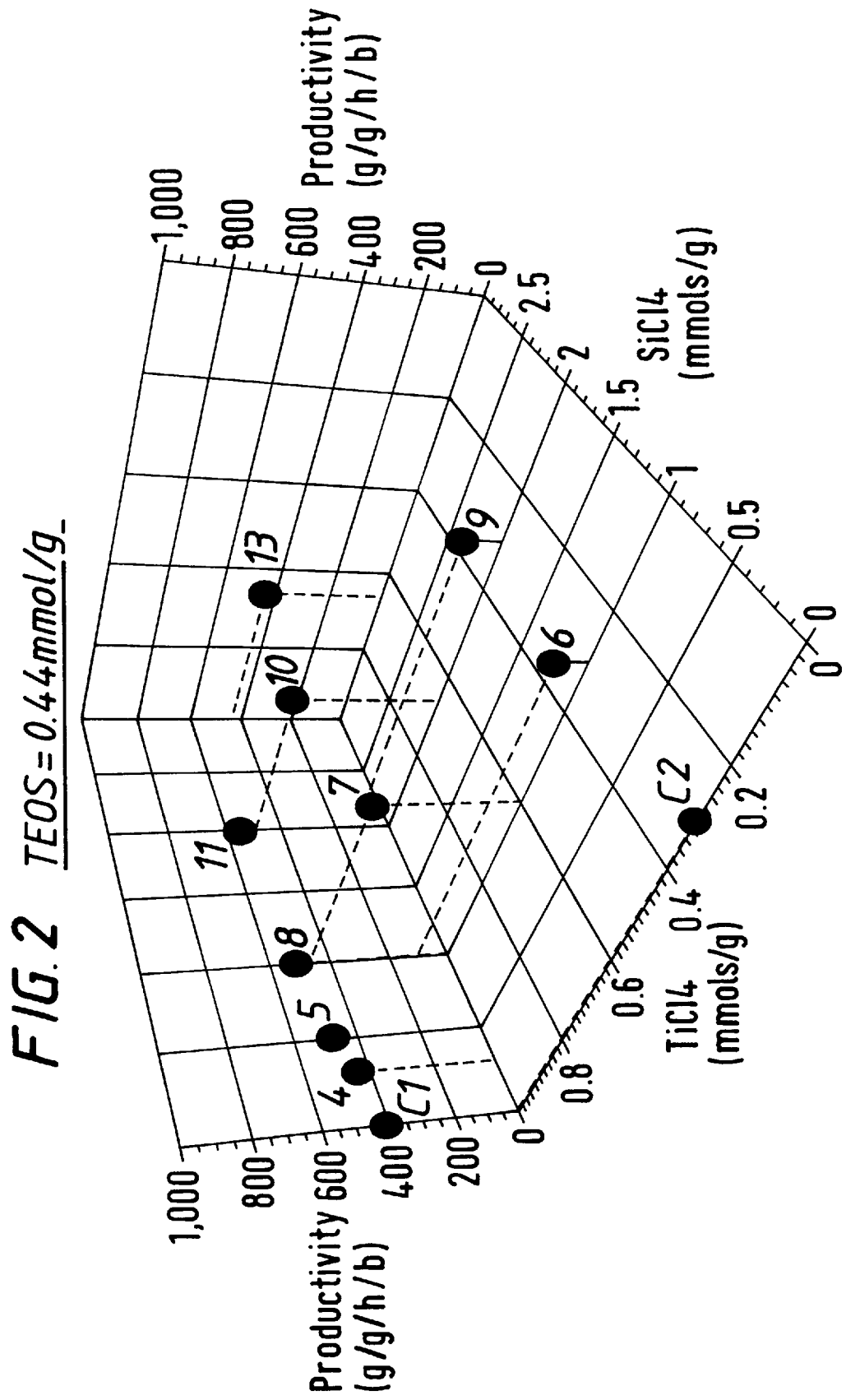
FIG. 2  TEOS=0.44mmol/g

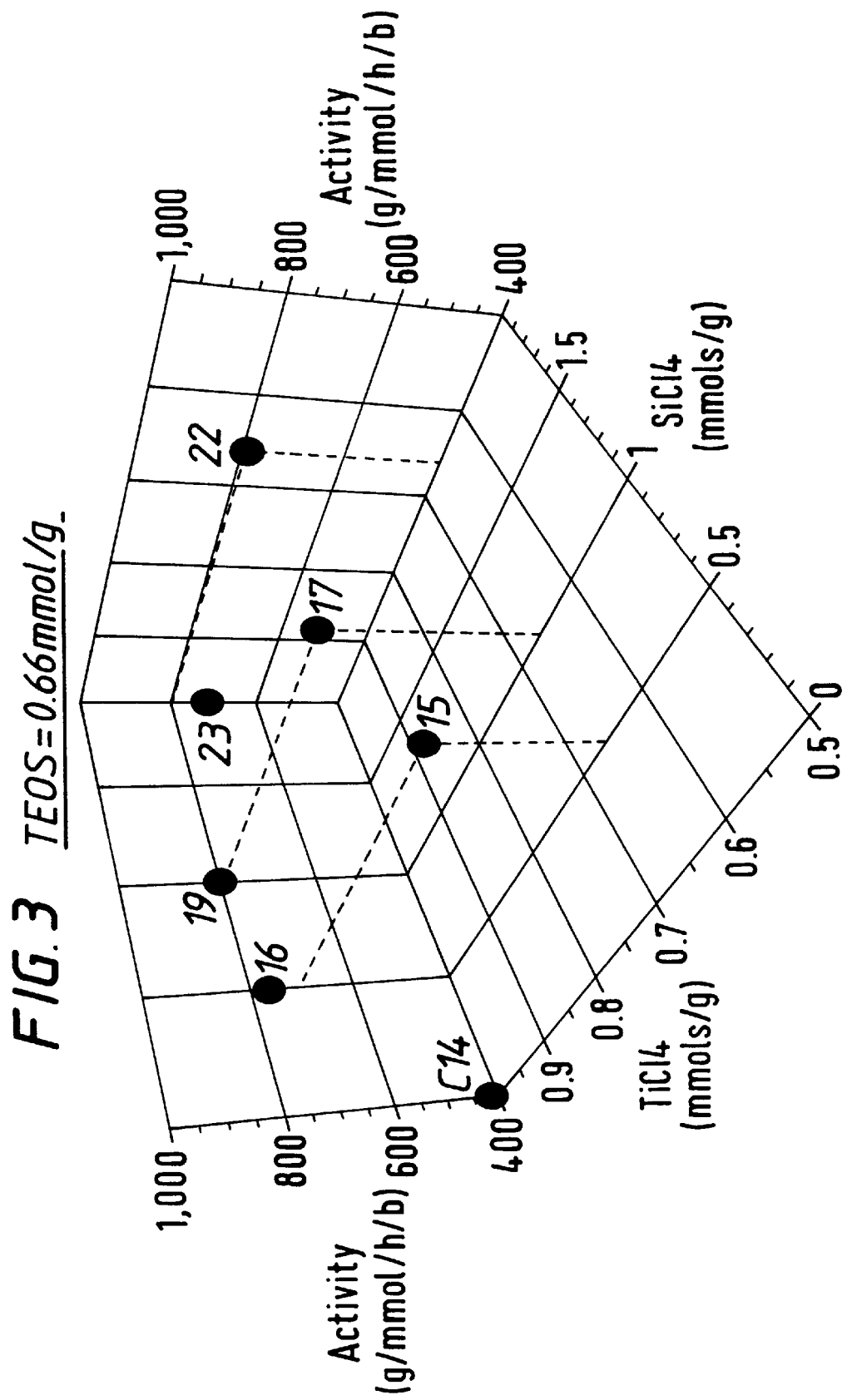
FIG. 3 TEOS=0.66mmol/g.

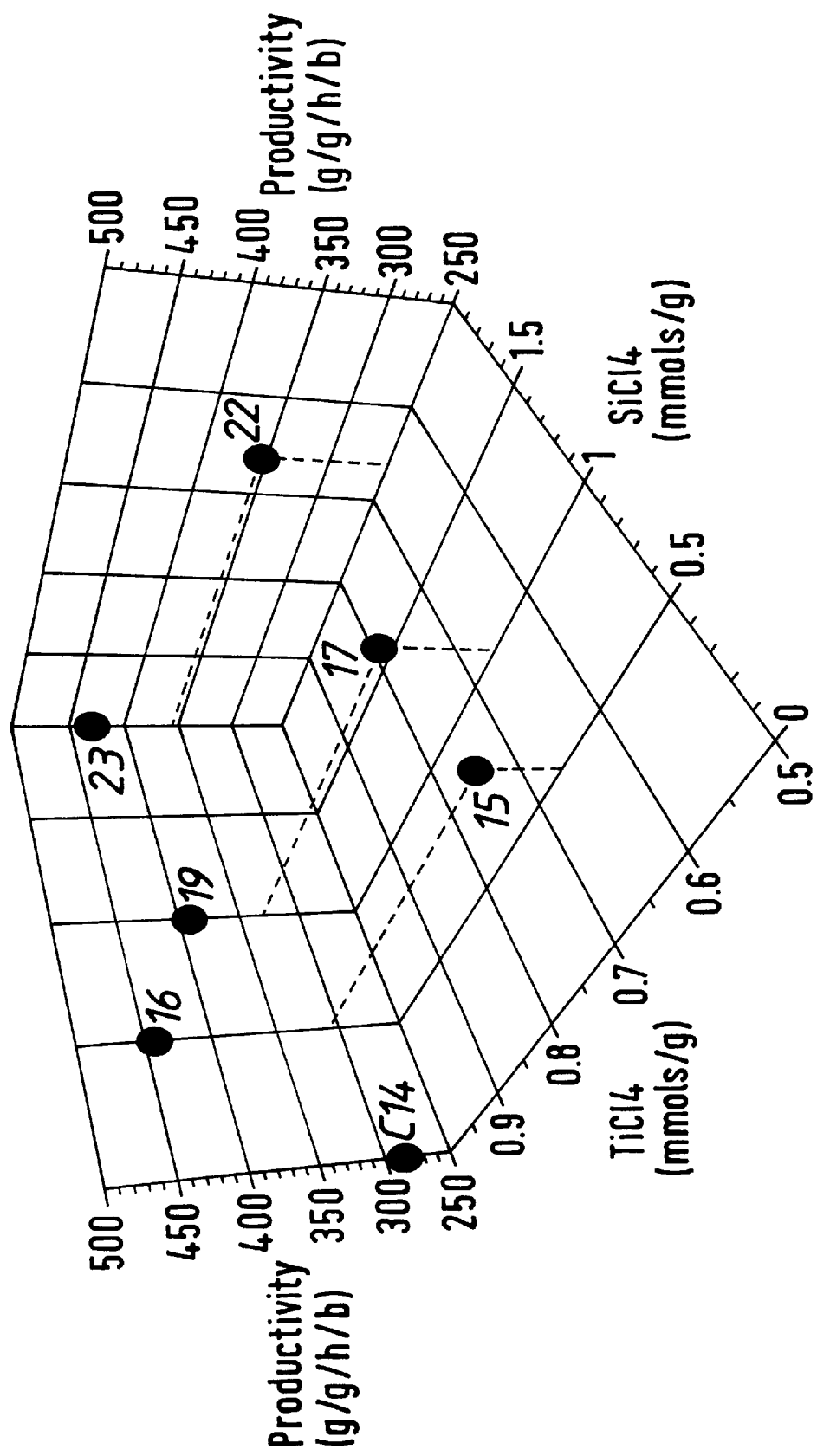
FIG. 4   TEOS=0.66mmol/g

HIGH ACTIVITY POLYETHYLENE CATALYSTS

The present invention relates to a method for the (co-)polymerisation of ethylene, to a catalyst composition for such a (co-)polymerisation and to a method for the preparation of such a catalyst composition.

It is an object of the present invention to provide a catalyst composition for polymerising ethylene with superior activity and so reduce the metal catalyst residues in the final polymer to the lowest possible level. It is still another additional object of the present invention to provide a catalytic process for polymerising ethylene at superior productivity.

International patent application WO95/13873 discloses a method for producing linear low density copolymers of ethylene ("LLDPE") in the presence of a high activity polyethylene catalyst. Said patent application claims a catalyst composition for copolymerising ethylene and an alpha olefin of 3 to 10 carbon atoms, comprising a catalyst precursor and a trialkylaluminium cocatalyst to activate said catalyst precursor, wherein the precursor comprises
(i) silica,
(ii) dibutylmagnesium,
(iii) tetraethyl orthosilicate,
(iv) and $TiCl_4$, each of the catalyst precursor components being used in specified ratios.

A catalyst composition has now unexpectedly been found which exhibits a superior activity, keeping the metal catalyst residue in the polyethylene product at the lowest possible level, and which allows to produce a broad range of polyethylene products. The polyethylene polymers produced with the catalyst compositions according to the present invention can be linear low density polyethylene (LLDPE) as well as high density polyethylene (HDPE); they can further show a molecular weight distribution from narrow to broad, which represents another advantage of the present invention.

According to the present invention, the catalyst composition for the (co-)polymerisation of ethylene, optionally with an alpha olefin of 3 to 10 carbon atoms, comprises a catalyst precursor and an organoaluminium cocatalyst, wherein the catalyst precursor consists of:
i) a silica carrier material, having from 0.3 to 1.2 mmoles of OH groups per gram of silica,
ii) a dialkylmagnesium compound of the formula $RMgR^1$, where R and $R^1$ are the same or different $C_2$–$C_{12}$ alkyl groups, in an amount comprised between 0.5 to 1.5 mmoles of dialkylmagnesium per gram of silica,
iii) a tetraalkyl orthosilicate, in which the alkyl groups contain from 2 to 6 carbon atoms, in an amount comprised between 0.2 to 0.8 mmoles of tetraalkyl orthosilicate per gram of silica,
iv) a chlorinated compound (X) having the formula $R_nSiCl_{4-n}$, wherein each R is the same or different and is hydrogen or an alkyl group and n is an integer from 0 to 3, in an amount comprised between 0.2 to 4 mmoles of X per gram of silica, and
v) a titanium compound in an amount comprised between 0.3 to 1.5 mmoles per gram of silica.

The silica carrier materials used in the present invention are preferably amorphous in form. These carriers may be in the form of particles having a particle size of from about 0.1 micron to about 250 microns, preferably from 10 to about 200 microns, and most preferably from about 10 to about 80 microns. Preferably, the carrier is in the form of spherical particles e.g. spray dried silica.

The internal porosity of these carriers may be larger than 0.2 $cm^3$/g, e.g. larger than about 0.6 $cm^3$/g. The specific surface area of these carriers is at least 3 $m^2$/g, preferably at least about 50 $m^2$/g, and more preferably from, e.g. about 150 to about 1500 $m^2$/g.

It is desirable to remove physically bound water from the carrier material prior to contacting this material with water-reactive magnesium compounds. This water removal may be accomplished by heating the carrier material to a temperature from about 100° C. to an upper limit of temperature represented by the temperature at which change of state or sintering occurs. A suitable range of temperatures may, thus, be from about 100° C. to about 850° C. Preferably, said temperature is comprised between 500° C. and 750° C.

Silanol groups represented by a presence of Si—OH groups in the carrier may be present when the carrier is contacted with water-reactive magnesium compounds in accordance with an aspect of the present invention. These Si—OH groups are present at about 0.3 to about 1.2 mmoles of OH groups per gram of carrier, preferably at about 0.3 to about 0.7 mmoles of OH groups per gram of carrier. Excess OH groups present in the carrier may be removed by heating the carrier for a sufficient time at a sufficient temperature to accomplish the desired removal. For example, the silica carrier, prior to the use thereof in the first catalyst synthesis step has been dehydrated by fluidising it with nitrogen or air and heating at least about 600° C. for at least about 5 hours to achieve a surface hydroxyl group concentration of less than about 0.7 mmoles per gram (mmoles/g).

The surface hydroxyl concentration (OH) of silica may be determined according to J. B. Peri and A. L. Hensley, Jr., J. Phys. Chem. , 72(8), 2926 (1968).

The silica of the most preferred embodiment is a material marketed under the tradename of ES70 by Crosfield and having a surface area of 280 $m^2$/g and a pore volume of 1.6 ml/g. Another preferred silica is a high surface area, amorphous silica (surface area=300 $m^2$/g ; pore volume of 1.65 $cm^3$/g), and it is a material marketed under the tradename of Davison 952 by the Davison Chemical Division of W. R. Grace and Company.

The dialkylmagnesium composition according to the present invention has the empirical formula $RMgR^1$ where R and $R^1$ are the same or different $C_2$–$C_{12}$ alkyl groups, preferably $C_4$–$C_{10}$ alkyl groups, more preferably $C_4$–$C_8$ alkyl groups, and most preferably both R and $R^1$ are butyl groups, and m and n are each 0, 1 or 2, providing that m+n is equal to the valence of Mg. Butylethylmagnesium, butyloctylmagnesium and dibutylmagnesium are preferably used according to the present invention, dibutylmagnesium being the most preferred.

The tetraalkyl orthosilicate according to the present invention has the formula $Si(OR)_4$ wherein R is $C_1$–$C_6$ alkyl compound. Typical examples of tetraalkyl orthosilicate which can be used in accordance with the invention include tetramethoxysilane, tetraethoxysilane, tetraisopropoxysilane, tetrapropoxysilane, tetrabutoxysilane.

Tetraethoxysilane is preferably used according to the present invention.

Examples of organoaluminium cocatalysts which can be used according to the present invention are dimethylaluminiumchloride, trimethylaluminium, triisobutylaluminium or triethylaluminium. Preferably, triethylaluminium is used.

Catalysts produced according to aspects of the present invention may be described in terms of the manner in which they can be made. More particularly, these catalysts can be described in terms of the manner in which a suitable carrier may be treated in order to form such catalysts.

The catalyst precursor according to the present invention is preferably prepared via a multi-step process which comprises the steps of:

(1) reacting a silica carrier material, having from 0.3 to 1.2 mmoles of OH groups per gram of silica, with a dialkylmagnesium compound of the formula $RMgR^1$, where R and $R^1$ are the same or different $C_2$–$C_{12}$ alkyl groups, in an amount comprised between 0.5 to 1.5 mmoles of dialkylmagnesium per gram of silica, in order to form a silica supported organomagnesium composition, (2) reacting said silica supported organomagnesium composition with a tetraalkyl orthosilicate, in which the alkyl group contains from 2 to 6 carbon atoms, in an amount comprised between 0.2 to 0.8 mmoles per gram of silica, (3) contacting the product from step (2) with a titanium compound in an amount comprised between 0.3 to 1.5 mmoles per gram of silica, said preparation process being characterised in that it further comprises the additional step of contacting either the product from step 1, or the product from step (2), or directly the silica support with a chlorinated compound (X) having the formula $R_nSiCl_{4-n}$, wherein each R is the same or different and is hydrogen or an alkyl group and n is an integer from 0 to 3, in an amount comprised between 0.2 to 4 mmoles of X per gram of silica.

The prepared catalyst precursor is subsequently contacted with an organoaluminium cocatalyst to activate the catalyst.

The above-mentioned catalyst precursor preparation method encompasses the possibility of adding the chlorinated compound (X), totally or partially either before step (2), i.e. before the addition of the tetraalkyl orthosilicate, and/or after step (2) i.e. before the addition of the titanium compound, and/or before the addition of the organomagnesium compound i.e. by premixing the silica support with said chlorinated compound (X). It has also been found that the tetraalkyl orthosilicate and the chlorinated compound (X) could also be premixed before adding said resulting premix to the slurry of the silica supported organomagnesium composition. Said premix is preferably obtained by mixing together a slurry of tetraalkyl orthosilicate with a slurry of chlorinated compound (X) in a suitable non polar solvent such as hexane or isopentane, at a temperature preferably between 25° C. and 65° C. and for a duration of 5 to 60 minutes. The respective amounts of tetraalkyl orthosilicate and of chlorinated compound (X) used to form the premix are preferably those which provide a molar ratio of tetraalkyl orthosilicate to chlorinated compound (X) comprised between 0.1 to 8.0, more preferably between 0.1 to 1.0.

Said four different preparation methods are disclosed in the examples.

The preferred catalyst precursor preparation method according to the present invention comprises the total addition of the chlorinated compound (X) after step (2) i.e. after the addition of the tetraalkyl orthosilicate and before the addition of the titanium compound. The following preparation procedure is therefore based on said preferred method.

The silica carrier material is slurried in a non-polar solvent and the resulting slurry is contacted with at least one organomagnesium composition. The slurry of the silica carrier material in the solvent is prepared by introducing the carrier into the solvent, preferably while stirring, and heating the mixture to about 25° to about 100° C., preferably to about 40° to about 60° C. The slurry is then contacted with the aforementioned organomagnesium composition while the heating is continued at the aforementioned temperature.

Suitable non-polar solvents are materials in which all of the reactants used herein, e.g. the organomagnesium composition (dialkylmagnesium), the transition metal (Ti) compound, are at least partially soluble and which are liquid at reaction temperatures. Preferred non-polar solvents are alkanes, such as isopentane, hexane, n-heptane, octane, nonane, and decane, although a variety of other materials including cycloalkanes, such as cyclohexane, aromatics, such as benzene and ethylbenzene, may also be employed. The most preferred non-polar solvent is hexane. Prior to use, the non-polar solvent should be purified, such as by percolation through silica gel and/or molecular sieves, to remove traces of water, oxygen, $CO_2$, polar compounds, and other materials capable of adversely affecting catalyst activity.

In the most preferred embodiment of the synthesis of this catalyst it is important to add only such an amount of the organomagnesium composition that will be deposited—physically or chemically—onto the support since any excess of the organomagnesium composition in the solution may react with other synthesis chemicals and precipitate outside of the support. The carrier drying temperature affects the number of sites on the silica carrier available for the organomagnesium composition—the higher the drying temperature the lower the number of sites. Thus, the exact molar ratio of the organomagnesium composition to the hydroxyl groups will vary and must be determined on a case-by-case basis to assure that only so much of the organomagnesium composition is added to the solution as will be deposited onto the silica support without leaving any excess of the organomagnesium composition in the solution. Furthermore, it is believed that the molar amount of the organomagnesium composition deposited onto the silica support is greater than the molar content of the hydroxyl groups on the silica support. Thus, the molar ratios given below are intended only as an approximate guideline and the exact amount of the organomagnesium composition in this embodiment must be controlled by the functional limitation discussed above, i.e. it must not be greater than that which can be deposited onto the silica support. If greater than that amount is added to the solvent, the excess may react with the reagents added subsequently to form the catalyst of the invention, thereby forming a precipitate outside of the support which is detrimental in the synthesis of our catalyst and must be avoided. The amount of the organomagnesium composition which is not greater than that deposited onto the support can be determined in any conventional manner, e.g. by adding the organomagnesium composition to the slurry of the silica carrier in the solvent, while stirring the slurry, until the organomagnesium composition is detected as a solution in the solvent.

The amount of organomagnesium added to the silica carrier is preferably comprised between 0.5 to 1.5 mmoles per gram of silica, more preferably between 0.8 to 1.2 mmoles per gram of silica. Preferably, the amount of the organomagnesium composition added to the slurry is such that the molar ratio of Mg to the hydroxyl groups (OH) on the solid carrier is about 0.8:1.0 to about 4.0:1.0, more preferably about 1.4:1.0 to about 3.0:1.0.

For example, for a silica carrier heated at about 600° C., the amount of the organomagnesium composition added to the slurry is such that the molar ratio of Mg to the hydroxyl groups (OH) on the solid carrier is about 1.0:1.0 to about 4.0:1.0, preferably about 1.2:1.0 to about 2.8:1.0, and more preferably about 1.4:1.0 to about 2.0:1.0.

According to a preferred example, for a silica carrier heated at about 700° C., the amount of the organomagnesium composition added to the slurry is such that the molar ratio of Mg to the hydroxyl groups (OH) on the solid carrier is about 1.0:1.0 to about 4.0:1.0, preferably about 1.5:1.0 to about 3.5:1.0, and more preferably about 2.0:1.0 to about 3.0:1.0.

The organomagnesium composition dissolves in the non-polar solvent to form a solution from which the organomagnesium composition is deposited onto the silica carrier.

It is also possible to add such an amount of the organomagnesium composition which is in excess of that which will be deposited onto the support, and then remove, e.g. by filtration and washing, any excess of the organomagnesium composition. However, this alternative is less desirable than the most preferred embodiment described above.

The slurry of the silica carrier material and of organomagnesium composition in the solvent is preferably maintained at a temperature comprised between 25° C. and 100° C., preferably between 40° C. and 60° C., for introduction of the tetraalkyl orthosilicate compound. The tetraalkyl orthosilicate compound is introduced after organomagnesium incorporation. The tetraalkyl orthosilicate compound is added to the slurry in an amount comprised between 0.2 to 0.8 mmoles per gram of silica, preferably between 0.3 to 0.8 mmoles per gram of silica, more preferably between 0.35 to 0.75 mmoles per gram of silica. Preferably, the tetraalkyl orthosilicate compound is added to the slurry in an amount to provide a molar ratio of tetraalkyl orthosilicate to Mg on the solid carrier of about 0.2 to about 1.6, more preferably about 0.25 to about 1.0, most preferably about 0.3 to about 0.9.

The slurry is then contacted (preferably after the completion of the addition of the tetraalkyl orthosilicate compound) with at least one chlorinated compound (X) having the formula $R_nSiCl_{4-n}$, wherein each R is the same or different and is hydrogen or an alkyl group, preferably a $C_1$–$C_{12}$ alkyl group, and n is an integer from 0 to 3. The chlorinated compound (X) is preferably selected from silicon tetrachloride and methyl trichlorosilane, the most preferred chlorinated compound (X) being silicon tetrachloride.

This contacting step is usually conducted at a temperature comprised between 25° C. and 100° C., preferably between 40° C. and 60° C. The chlorinated compound (X) is added to the slurry in an amount comprised between 0.2 to 4 mmoles of X per gram of silica, preferably between 1 to 2 mmoles of X per gram of silica. Preferably, the chlorinated compound (X) is added to the slurry in an amount such to provide a molar ratio of X: Mg of 0.1 to 4.0, more preferably about 0.5 to about 3.0, most preferably about 1.5 to 2.5.

The slurry is then contacted with at least one transition metal (Ti) compound soluble in the non-polar solvent, preferably after the addition of the chlorinated compound (X) is completed.

The transition metal compound is used in an amount comprised between 0.3 to 1.5 mmoles per gram of silica, preferably between 0.5 to 1.4 mmoles per gram of silica. The exact molar ratio of Mg to the transition metal and of the transition metal to the hydroxyl groups of the carrier will vary (depending, e.g. on the carrier drying temperature) and must be determined on a case-by-case basis. Preferably, the amount of the transition metal compound is such that the molar ratio of the transition metal to Mg is about 0.4 to about 1.4, more preferably about 0.6 to about 1.0. These conditions apply particularly for a silica carrier heated at about 200° to about 850° C.

The transition metal compounds are titanium compounds, preferably tetravalent titanium compounds. The most preferred titanium compound is titanium tetrachloride. Mixtures of such titanium metal compounds may also be used.

The contact of the transition metal compound with the liquid medium conveniently takes place by slurrying the solid carrier containing the reactive magnesium composition with the neat transition metal compound and maintaining the resulting liquid medium at a temperature comprised between 25° C. and 100° C., preferably between 40° C. and 60° C.

Once all of the catalyst components have been brought into contact according to the present invention, the resulting slurry is then preferably heated and maintained at a temperature between about 25° C. and 65° C. in order to proceed with the synthesis step. Preferably, this synthesis step is conducted at a temperature between 30° C. and 60° C., more preferably between 45° C. and 55° C. Preferably the catalyst is then subjected to a conventional drying step.

The final catalyst precursor thus obtained is then activated with suitable activators. Suitable activators include the organoaluminium cocatalysts already disclosed hereabove.

The catalyst may be activated in situ by adding the activator and catalyst separately to the polymerisation medium. It is also possible to combine the catalyst and activator before introduction into the polymerisation medium, e.g. for up to about 2 hours at a temperature from –10° to about 80° C.

A suitable activating amount of the activator may be used. The number of moles of activator per gram atom of titanium in the catalyst may be, e.g. from about 1 to about 100 and is preferably greater than about 3.

Ethylene may be polymerised with the catalysts prepared according to aspects of the present invention by any suitable process. Such processes include polymerisations carried out in suspension, in solution or in the gas phase. Gas phase polymerisations are preferred such as those taking place in stirred bed reactors and, especially, in fluidised bed reactors.

The molecular weight of the polymer may be controlled in a known manner, preferably by using hydrogen. With the catalysts produced according to aspects of the present invention, molecular weight may be suitably controlled with hydrogen when the polymerisation is carried out at relatively low temperatures, e.g. from about 30° to about 105° C. This control of molecular weight may be evidenced by a measurable positive melt index ($MI_{2.16}$) for the polymer produced.

When using the catalyst according to the present invention it is possible to produce polymers showing a broad range of molecular weight distribution, i.e. from narrow to broad.

The molecular weight distribution of a polymer is usually indicated by the melt flow ratio value. Said melt flow ratio (MFR) is the ratio of the high load melt index ($HLMI_{21.6}$) to the melt index ($MI_{2.16}$) of the polymer, which are measured according to ASTM-D-1238.

When comparing the catalysts of the present invention with those disclosed in the aforementioned International patent application WO95/13873 another surprising advantage of the present invention was found, on top of the already identified benefits of the invention: indeed, the addition of the chlorinated compound (X) according to the present invention does not appear to significantly increase the MFR value of the prepared products. Therefore, the present invention allows to produce polymers with a higher activity than before while maintaining the MFR value in the lower range, i.e. where the impact strength is still high.

The catalysts prepared according to aspects of the present invention are highly active. This is demonstrated by the following examples which show that, under exactly the same polymerisation conditions, the activity of the treated catalyst is unexpectedly high.

EXAMPLES

A. Catalyst preparation

All catalysts, except comparative example 1, were prepared in the laboratory at ca. 20 g scale. The silica used for all the catalysts was ES70 manufactured by Crosfield, calcined at 700° C. under nitrogen giving an OH population of 0.4 mmol/g. The solvent used was hexane. Unless otherwise stated the general preparation procedure was:

20 g of the silica was added to a glass reactor containing about 120 ml solvent and equipped with a stirrer. The slurry was stirred at 250 rpm and heated to 50° C. Dibutyl magnesium (DBM) was then added at an amount of 1 mmol per g of silica and the mixture stirred for 1 hour. Tetraethyl orthosilicate (TEOS) was then added and the mixture stirred for 2 hours. Silicon tetrachloride (SiCl) (varying amounts) was then added and the mixture stirred for a further 1 hour. Titanium tetrachloride (TiCl) (varying amounts) was then added and the catalyst stirred for 1 hour. The catalyst was transferred by cannular to a schlenk tube and dried under a flow of nitrogen at 50° C. The final drying step was performed under vacuum at ambient temperature. All catalysts were stored in a glovebox.

The comparative example C2 and C14 catalysts were prepared using the above method.

The comparative example C1 catalyst was prepared using the above method but with 12000 g silica.

All quantities of the various components used are shown in the following tables.

For the catalysts where the TEOS and $SiCl_4$ were premixed, this was done in a separate Schlenk tube in 50 ml hexane for various times (see Table 3) at room temperature prior to its use in the preparation. After addition of the $TEOS/SiCl_4$ premix to the silica/DBM, the resulting mixture was stirred for 1 hour at 50° C. prior to the addition of the TiCl.

The "mmol/g" amounts mentioned in the following tables means millimole of respective component added per gram of silica.

TABLE 1

| | | Added Components | | | | Analyses | |
|---|---|---|---|---|---|---|---|
| Cat Code | $SiO_2$ (g) | DBM (mmol/g) | TEOS (mmol/g) | $SiCl_4$ (mmol/g) | $TiCl_4$ (mmol/g) | Mg (wt %) | Ti (wt %) |
| C1 | 12000 | 1 | 0.44 | 0.0 | 1.00 | 1.83 | 3.27 |
| C2 | 19.8 | 1 | 0.44 | 0.0 | 0.30 | 2.10 | 1.03 |
| 3 | 17.9 | 1 | 0.44 | 0.3 | 0.70 | 2.01 | 2.36 |
| 4 | 18.8 | 1 | 0.44 | 0.3 | 1.00 | 1.71 | 2.70 |
| 5 | 19.6 | 1 | 0.44 | 0.5 | 1.00 | 2.09 | 2.85 |
| 6 | 18.5 | 1 | 0.44 | 1.0 | 0.30 | 1.73 | 1.68 |
| 7 | 20.1 | 1 | 0.44 | 1.0 | 0.60 | 1.78 | 2.35 |
| 8 | 20.5 | 1 | 0.44 | 1.0 | 1.00 | 1.98 | 2.82 |
| 9 | 17.1 | 1 | 0.44 | 2.0 | 0.33 | 2.09 | 1.54 |
| 10 | 18.0 | 1 | 0.44 | 2.0 | 0.66 | 1.77 | 2.14 |
| 11 | 18.2 | 1 | 0.44 | 2.0 | 1.00 | 1.53 | 2.51 |
| 12 | 18.6 | 1 | 0.44 | 2.0 | 1.00 | 2.20 | 3.24 |
| 13 | 20.2 | 1 | 0.44 | 3.0 | 0.66 | 1.S1 | 2.21 |
| C14 | 18.6 | 1 | 0.66 | 0.0 | 1.00 | 1.84 | 3.36 |
| 15 | 21.2 | 1 | 0.66 | 0.5 | 0.66 | 1.88 | 2.08 |
| 16 | 20.6 | 1 | 0.66 | 0.5 | 1.00 | 1.83 | 2.74 |
| 17 | 20.6 | 1 | 0.66 | 1.0 | 0.66 | 1.88 | 2.07 |
| 18 | 20.8 | 1 | 0.66 | 1.0 | 1.00 | 1.69 | 2.37 |
| 19 | 20.4 | 1 | 0.66 | 1.0 | 1.00 | 1.17 | 2.29 |
| 20 | 18.2 | 1 | 0.66 | 1.0 | 1.00 | 1.86 | 2.96 |
| 21 | 20.6 | 1 | 0.66 | 2.0 | 0.66 | 1.77 | 2.17 |
| 22 | 20.2 | 1 | 0.66 | 2.0 | 0.66 | 1.79 | 2.12 |
| 23 | 20.0 | 1 | 0.66 | 2.0 | 1.00 | 1.80 | 2.88 |

TABLE 2

| | | Added Components | | | | | Analyses | |
|---|---|---|---|---|---|---|---|---|
| Cat Code | $SiO_2$ (g) | DBM (mmol/g) | TEOS (mmol/g) | $SiCl_4$ (mmol/g) | $TiCl_4$ (mmol/g) | Description | Mg (wt %) | Ti (wt %) |
| 24 | 19.9 | 1 | 0.44 | 1 | 1 | $SiO_2/SiCl_4/DBM/TEOS/TiCl_4$ | 1.68 | 2.6 |
| 25 | 19.4 | 1 | 0.44 | 0.7 | 1 | $SiO_2/SiCl_4/DBM/TEOS/TiCl_4$ | 1.74 | 2.56 |
| 26 | 19.6 | 1 | 0.44 | 2 | 0.66 | $SiO_2/DBM/SiCl_4/TEOS/TiCl_4$ | 1.7 | 2.38 |

The order of addition of the reactants is indicated in the "Description" column of Table 2:
  for catalysts 24 and 25, the silica support was premixed with the $SiCl_4$,
  for catalyst 26, the $SiCl_4$ was added after the addition of the DBM and before the addition of the TEOS.

TABLE 3

| Cat Code | Added Components | | | | | Premix time (mins) | Analyses | |
|---|---|---|---|---|---|---|---|---|
| | SiO$_2$ (g) | DBM (mmol/g) | TEOS (mmol/g) | SiCl$_4$ (mmol/g) | TiCl$_4$ (mmol/g) | | Mg (wt %) | Ti (wt %) |
| 27 | 20 | 1 | 0.44 | 2 | 0.66 | 60 | 1.93 | 2.94 |
| 28 | 19.5 | 1 | 0.44 | 1 | 1 | 60 | 1.57 | 2.51 |
| 29 | 18.4 | 1 | 0.44 | 0.5 | 1 | 60 | 1.96 | 3.03 |
| 30 | 18.6 | 1 | 0.44 | 2 | 0.66 | 10 | 2.06 | 2.32 |
| 31 | 18.2 | 1 | 0.44 | 1 | 1 | 10 | 2 | 2.85 |

B. Slurry Phase Testing (SPT)

In a 2.16 liter stainless steel reactor containing hexane, hexene-1 and triethylaluminium (TEA) are introduced. Hydrogen and ethylene are then introduced. The catalyst is then injected into the reactor. A constant pressure is kept in the reactor by ethylene feed. After polymerisation, the ethylene feed is stopped, the reactor degassed and cooled. The slurry of copolymer is recovered and the powder is separated from the solvent. The polymerisation conditions and results are summarised in the following tables.

FIGS. 1 to 4 are 3-D figures reporting some of the activity/productivity results given in Table 1 SPT. The numbers associated with the points correspond to the catalyst codes.

| | |
|---|---|
| Temperature (° C.) | 85 |
| pC2 (barg) | 85 |
| pH2 (barg) | 1.2 |
| C6 (ml) | 200 |
| TEA (mmol) | 3 |

TABLE 1

SPT

Slurry Results

| Catalyst code | activity (g/mmol Ti/b/h) | productivity (g/g/b/h) | MI | MFR | density g/cm3 |
|---|---|---|---|---|---|
| C1 | 596 | 407 | 1.4 | 25.9 | 925.5 |
| C2 | 44 | 9 | N/M | N/M | N/M |
| 3 | 183 | 89 | N/M | N/M | N/M |
| 4 | 778 | 439 | 1.8 | 27.9 | 920.0 |
| 5 | 801 | 558 | 1.2 | 25.8 | 926.5 |
| 6 | 284 | 100 | N/M | N/M | N/M |
| 7 | 959 | 471 | 1.2 | 26.3 | 923.5 |
| 8 | 923 | 543 | 2.1 | 26.6 | 920.0 |
| 9 | 393 | 126 | 0.6 | 25.5 | 931.5 |
| 10 | 1052 | 470 | 1.1 | 25.8 | 924.2 |
| 11 | 1071 | 563 | 2.6 | 27.7 | 919.0 |
| 13 | 959 | 443 | 1.1 | 25.7 | 923.5 |
| C14 | 394 | 276 | 0.7 | 24.7 | 927.0 |
| 15 | 704 | 306 | 0.6 | 24.7 | 925.5 |
| 16 | 770 | 440 | 0.6 | 25.2 | 924.5 |
| 17 | 785 | 339 | 0.9 | 25.0 | 924.0 |
| 19 | 819 | 391 | 0.8 | 25.2 | 922.5 |
| 22 | 816 | 361 | 0.9 | 25.4 | 925.0 |
| 23 | 720 | 433 | 1.2 | 24.8 | 924.0 |

TABLE 2

SPT

Slurry Results

| Catalyst code | activity (g/mmol Ti/b/h) | productivity (g/g/b/h) | MI | MFR | density g/cm3 |
|---|---|---|---|---|---|
| 24 | 849 | 461 | 1.4 | 28.1 | 921.0 |
| 25 | 856 | 457 | 1.6 | 28.3 | 920.5 |
| 26 | 904 | 449 | 1.1 | 25.1 | 926.2 |

TABLE 3

SPT

Slurry Results

| Catalyst code | activity (g/mmol Ti/b/h) | productivity (g/g/b/h) | MI | MFR | density g/cm3 |
|---|---|---|---|---|---|
| 27 | 707 | 430 | 1.13 | 26.7 | 922.5 |
| 28 | 773 | 412 | 0.84 | 26.9 | 924.0 |
| 29 | 919 | 581 | 1.34 | 27.0 | 922.0 |
| 30 | 858 | 416 | 1.04 | 25.6 | 924.0 |
| 31 | 881 | 535 | 1.83 | 27.9 | 922.0 |

N/M=not measured

Activity and productivity are the average during the test g/mmol Ti/b/h=weight polymer (g)/Ti added to reactor (mmol)/ethylene pressure (bar)/time (minutes)×60 g/g/b/h=weight polymer (g)/catalyst weight added to reactor (g)/ethylene pressure (bar)/time (minutes)×60

MI=melt index (MI2.16) of the polymer (measured according to ASTM-D-1238)

MFR (melt flow ratio)=ratio of the high load melt index (HLMI21.6) to the melt index (MI2.16) of the polymer The density is measured according to ASTM/D2839

C. Stirred Gas Phase Testing

The stirred gas phase (SGP) autoclave copolymerisation tests were performed using a 2.51 autoclave. A seed bed was added to the reactor prior to composition of the gas phase and heating to reaction temperature. Following injection of the catalyst, the gas phase composition was monitored by mass spectrometry with comonomer and hydrogen being added to maintain constant C6/C2 and H2/C2 ratios.

The polymerisation conditions and results are summarised in the following Tables.

HDPE high density polyethylene

LLDPE=linear low density polyethylene

|  | HDPE | LLDPE |
|---|---|---|
| Temperature (° C.) | 90 | 85 |
| pC2 (barg) | 4 | 4 |
| pH2 (barg) | 2 | 1.1 |
| Comonomer | 1-hexene | 1-hexene |
| C6 (barg) | 0.04 | 0.4–0.6 |
| TEA mmol | 0.5 | 0.5 |

TABLE 1

SGP/HDPE

Stirred Gas Phase Results

| Catalyst code | PE | activity (g/mmol Ti/b/h) | productivity (g/g/b/h) | MI | MFR | density |
|---|---|---|---|---|---|---|
| C1 | HDPE | 163 | 111 | 3.2 | 27.0 | 953.4 |
| 10 | HDPE | 368 | 164 | 0.7 | 28.4 | N/M |
| 12 | HDPE | 294 | 199 | 1.2 | 28.1 | 952.0 |
| C14 | HDPE | 47 | 33 | 0.7 | 25.1 | 951.0 |
| 18 | HDPE | 103 | 51 | N/M | N/M | 959.0 |
| 21 | HDPE | 130 | 59 | N/M | N/M | 951.0 |

TABLE 2

SGP/LLDPE

Stirred Gas Phase Results

| Catalyst code | PE | activity (g/mmol Ti/b/h) | productivity (g/g/b/h) | MI | MFR | density |
|---|---|---|---|---|---|---|
| C1 | LLDPE | 418 | 285 | 0.3 | 30.9 | 929.0 |
| 10 | LLDPE | 994 | 444 | 0.3 | 28.8 | 929.0 |
| 12 | LLDPE | 696 | 471 | 0.3 | 28.6 | 930.0 |
| C14 | LLDPE | 159 | 112 | 0.2 | 25.0 | N/M |
| 16 | LLDPE | 406 | 232 | 0.3 | 25.8 | 933.0 |
| 20 | LLDPE | 479 | 296 | 0.3 | 26.9 | 925.0 |
| 22 | LLDPE | 435 | 193 | N/M | N/M | N/M |
| 23 | LLDPE | 563 | 339 | 0.3 | 24.4 | 931.0 |

TABLE 3

SGP/LLDPE

Stirred Gas Phase Results

| Catalyst code | activity (g/mmol Ti/b/h) | productivity (g/g/b/h) | MI | MFR | density |
|---|---|---|---|---|---|
| 29 | 701 | 434 | 0.4 | 33.2 | 925.0 |
| 31 | 895 | 533 | 0.4 | 30.1 | 928.0 |

N/M=not measured
Activity and productivity are the average during the test
g/mmol Ti/b/h=weight polymer (g)/Ti added to reactor (mmol)/ethylene pressure (bar)/time (minutes)×60
g/g/b/h=weight polymer (g)/catalyst weight added to reactor (g)/ethylene pressure (bar)/time (minutes)×60
MI=melt index (MI2.16) of the polymer (measured according to ASTM-D-1238)
MFR (melt flow ratio)=ratio of the high load melt index (HLMI21.6) to the melt index (MI2.16) of the polymer
The density is measured according to ASTM/D2839.

We claim:

1. Catalyst composition for the (co-)polymerisation of ethylene optionally with an alpha olefin of 3 to 10 carbon atoms, comprising a catalyst precursor and an organoaluminium cocatalyst, wherein the catalyst precursor consists of:
   (i) a silica carrier material, having from 0.3 to 1.2 mmoles of OH groups per gram of silica,
   (ii) a dialkylmagnesium compound of the formula $RMgR^1$, where R and $R^1$ are the same or different $C_2$–$C_{12}$ alkyl groups, in an amount between 0.5 and 1.5 mmoles of dialkylmagnesium per gram of silica,
   (iii) a tetraalkyl orthosilicate, in which each of the alkyl groups contains from 1 to 6 carbon atoms, in an amount between 0.2 and 0.8 mmoles of tetraalkyl orthosilicate per gram of silica,
   (iv) a chlorinated compound (X) having the formula $R_nSiCl_{4-n}$, wherein each R is the same or different and is hydrogen or an alkyl group and n is an integer from 0 to 3, in an amount between 0.2 and 4 mmoles of X per gram of silica, and
   (v) a titanium compound in an amount between 0.3 and 1.5 mmoles per gram of silica.

2. Catalyst composition according to claim 1 wherein the silica carrier material has from 0.3 to 0.7 mmoles of OH groups per gram of silica.

3. Catalyst composition according to claim 1 wherein the dialkylmagnesium compound is butylethylmagnesium, butyloctylmagnesium, dibutylmagnesium, or mixtures thereof.

4. Catalyst composition according to claim 1 wherein the dialkylmagnesium compound is dibutylmagnesium.

5. Catalyst composition according to claim 1 wherein the tetraalkyl orthosilicate is selected from the group consisting of tetramethyoxysilane, tetraethoxysilane, tetraisopropoxysilane, tetrapropoxysilane, tetrabutoxysilane, and mixtures thereof.

6. Catalyst composition according to claim 1 wherein the tetraalkyl orthosilicate is tetraethoxysilane.

7. Catalyst composition according to claim 1 wherein the organoaluminium cocatalyst is selected from the group consisting of dimethyl-aluminiumchloride, trimethylaluminium, triisobutylaluminium, triethylaluminium, and mixtures thereof.

8. Catalyst composition according to claim 1 wherein the organoaluminium cocatalyst is triethylaluminium.

9. Catalyst composition according to claim 1 wherein the titanium compound is a tetravalent titanium compound or any mixtures thereof.

10. Catalyst composition according to claim 1 wherein the titanium compound is titanium tetrachloride.

11. Catalyst composition according to claim 1 wherein the chlorinated compound (X) has the formula $R_nSiCl_{4-n}$, wherein each R is the same or different and is hydrogen or a $C_1$–$C_{12}$ alkyl group and n is an integer from 0 to 3.

12. Catalyst composition according to claim 1 wherein the chlorinated compound (X) is selected from the group consisting of silicon tetrachloride, methyl trichlorosilane and mixtures thereof.

13. Catalyst composition according to claim 1 wherein the chlorinated compound (X) is silicon tetrachloride.

14. Process for the preparation of a catalyst precursor which comprises the steps of:
   (1) reacting a silica carrier material, having from 0.3 to 1.2 mmoles of OH groups per gram of silica, with a dialkylmagnesium compound of the formula $RMgR^1$, where R and $R^1$ are the same or different $C_2$–$C_{12}$ alkyl groups, in an amount between 0.5 and 1.5 mmoles of dialkylmagnesium per gram of silica, in order to form a silica supported organomagnesium composition, (2) reacting said silica supported organomagnesium composition with a tetraalkyl orthosilicate, in which each of the alkyl groups contains from 1 to 6 carbon atoms, in an amount between 0.2 and 0.8 mmoles of tetraalkyl orthosilicate per gram of silica, (3) contacting the product from step (2) with a titanium compound in an amount between 0.3 and 1.5 mmoles per gram of silica, said preparation process further including the additional step of contacting either the product from step (1), or the product of step (2), or the silica support directly with a chlorinated compound (X) having the formula $R_nSiCl_{4-n}$, wherein each R is the same or different and is hydrogen or an alkyl group and n is an integer from 0 to 3, in an amount of from 0.2 to 4 mmoles of X per gram of silica.

15. Process according to claim 14 wherein the total addition of the chlorinated compound (X) is performed after the addition of the tetraalkyl orthosilicate and before the addition of the titanium compound.

* * * * *